(12) United States Patent
Ling et al.

(10) Patent No.: US 12,105,051 B1
(45) Date of Patent: Oct. 1, 2024

(54) DETECTION APPARATUS AND DETECTION SYSTEM FOR RAILWAY BRIDGE DUCT CONCRETE COMPACTNESS

(71) Applicants: CHINA TIESIJU CIVIL ENGINEERING GROUP CO., LTD., Hefei (CN); Anhui China Railway Engineering Technology Co., Ltd, Hefei (CN)

(72) Inventors: Benchun Ling, Hefei (CN); Yonghua Chen, Hefei (CN); Jinghai Lu, Hefei (CN); Jiaxing Ji, Hefei (CN)

(73) Assignees: CHINA TIESIJU CIVIL ENGINEERING GROUP CO., LTD., Hefei (CN); Anhui China Railway Engineering Technology Co., Ltd, Hefei (CN)

( * ) Notice: Subject to any disclaimer, the term of this patent is extended or adjusted under 35 U.S.C. 154(b) by 0 days.

(21) Appl. No.: 18/673,043

(22) Filed: May 23, 2024

(30) Foreign Application Priority Data

Jun. 6, 2023 (CN) .......................... 202310662206.X

(51) Int. Cl.
*G01N 29/04* (2006.01)
(52) U.S. Cl.
CPC ... *G01N 29/045* (2013.01); *G01N 2291/0232* (2013.01); *G01N 2291/0289* (2013.01)
(58) Field of Classification Search
CPC ......... G01N 29/045; G01N 2291/0232; G01N 2291/0289
See application file for complete search history.

(56) References Cited

U.S. PATENT DOCUMENTS

| | | | |
|---|---|---|---|
| 2023/0104546 A1 | 4/2023 | Zhang et al. | |
| 2024/0042940 A1* | 2/2024 | Blackburn, Jr. | .......... B60R 9/06 |

FOREIGN PATENT DOCUMENTS

| | | | | |
|---|---|---|---|---|
| CN | 1982889 | A | 6/2007 | |
| CN | 103868992 | A | 6/2014 | |
| CN | 108072699 | A | 5/2018 | |
| CN | 108254440 | A | 7/2018 | |
| CN | 108918679 | A | 11/2018 | |
| CN | 109212029 | A | 1/2019 | |
| CN | 109629846 | A | 4/2019 | |
| CN | 108254440 | B | * 10/2020 | .......... G01N 29/045 |

(Continued)

OTHER PUBLICATIONS

First Office Action issued in counterpart Chinese Patent Application No. 202310662206.X, dated Jul. 12, 2023.

(Continued)

*Primary Examiner* — Xin Y Zhong
(74) *Attorney, Agent, or Firm* — Westbridge IP LLC

(57) ABSTRACT

A detection apparatus for a railway bridge duct concrete compactness includes a probe and a vibration hammer, where a bearing plate is disposed below the probe and the vibration hammer, and a transportation structure is disposed below the bearing plate while a girder is disposed above the bearing plate; a tail end of the probe is provided with a reciprocating screw and an outer cylinder, the outer cylinder is in drive connection with the transportation structure, a winding rod for controlling the position of the vibration hammer is disposed below the vibration hammer, and photoelectric switches are disposed on one side of the probe.

7 Claims, 6 Drawing Sheets

(56) References Cited

FOREIGN PATENT DOCUMENTS

| | | | |
|---|---|---|---|
| CN | 113803566 | A | 12/2021 |
| CN | 215641037 | U | 1/2022 |
| CN | 114354479 | A | 4/2022 |
| CN | 114354756 | A | 4/2022 |
| CN | 115015393 | A | 9/2022 |
| CN | 115234747 | A | 10/2022 |
| CN | 217901639 | U * | 11/2022 |
| CN | 116147547 | A | 5/2023 |
| EP | 0593346 | A1 | 4/1994 |
| JP | S62261956 | A | 11/1987 |

OTHER PUBLICATIONS

Notification to Grant Patent Right for Invention issued in counterpart Chinese Patent Application No. 202310662206.X, dated Jul. 31, 2023.

* cited by examiner

DETECTION APPARATUS AND DETECTION SYSTEM FOR RAILWAY BRIDGE DUCT CONCRETE COMPACTNESS

CROSS-REFERENCE TO RELATED APPLICATIONS

The application claims priority to Chinese Patent Application No. 202310662206.X, filed on Jun. 6, 2023, which is incorporated herein by reference in its entirety.

TECHNICAL FIELD

The present disclosure relates to the field of road and bridge construction detection, and in particular to a detection apparatus and a detection system for a railway bridge duct concrete compactness.

BACKGROUND

The duct concrete compactness detection is to detect the degree of compactness between the concrete outside the duct and a prefabricated pipe fitting, bubbles mixed in the concrete or cracks generated in the concrete may be caused due to inadequate concrete vibration and other situations during pouring, which will lead to the decrease of the project quality and exist risks, and therefore after the concrete is solidified, the compactness thereof needs to be detected, to take preventive measures.

Multiple forms for the existing duct concrete compactness detection are available, including an impact-echo method, a ray radiation method, an ultrasonic method, a geological radar method and the like, where the impact-echo method is that a low-frequency stress wave is generated on a concrete surface at a prestressing duct by using an instantaneous mechanical shock, the stress wave is propagated to the inside of a structure, reflected back by a component bottom surface or a defective surface, and reflected back and forth among the component surface, the internal defective surface or the component bottom to generate a transient resonance, a resonant frequency thereof can be distinguished from an amplitude spectrum, and then the stress wave reflected back is subjected to time-domain analysis and frequency-domain analysis, to determine the uncompacted area of the prestressing duct concrete. To ensure the accuracy of the measuring result, a plurality of equidistant testing points will be usually determined on a concrete facade, all the points are subjected to data collection, and analysis is performed through a data parsing system to obtain a defect position.

Most of the existing collection points are provided on the concrete facade, however some concrete structures do not have the facades, or timely testing is required during construction, the testing point positions need to be set in a pipe, thus there are many inconveniences for manual testing, the difficulty of operation increases sharply; meanwhile the accuracy of the data is not easy to control, the detection performed on the concrete facade is easily affected by the prefabricated pipe parts, thus not positioning the defect position more accurately; and therefore the present disclosure provides a detection apparatus and a detection system for a railway bridge duct concrete compactness, to solve the foregoing issue.

SUMMARY

To solve the issue of inconvenient construction data detection for some concretes, the present disclosure provides a detection apparatus and a detection system for a railway bridge duct concrete compactness.

The detection apparatus and the detection system for the railway bridge duct concrete compactness provided by the present disclosure adopt the following technical solution.

A detection apparatus for a railway bridge duct concrete compactness includes a probe in communication connection with a detection device, and a vibration hammer used in combination with the probe, where a bearing plate for transportation is disposed below the probe and the vibration hammer, and a transportation structure is disposed below the bearing plate while a girder is disposed at a middle-line position above the bearing plate.

A tail end of the probe is movably connected with a reciprocating screw, an outer side of the reciprocating screw is rotationally connected with an outer cylinder, the outer cylinder is in drive connection with the transportation structure, the reciprocating screw performs an axial reciprocating motion together with the probe under the rotating action of the outer cylinder, and the outer cylinder is rotationally connected with the girder through a limiting ring.

A winding rod for controlling a position of the vibration hammer is disposed below the vibration hammer, the winding rod is in drive connection with the outer cylinder through an O-shaped conveyor belt, and both ends of the winding rod are provided with a one-way limiting structure.

One side of the probe is provided with photoelectric switches, the photoelectric switches are used in cooperation with the one-way limiting structure, a slipping sheet that displaces synchronously with the probe is disposed on one side of the probe, the slipping sheet is used in fit with the photoelectric switches, and after the photoelectric switches are triggered, the one-way limiting structure loses a one-way limiting function.

Preferably, the outer cylinder is provided with a movable groove along an axial direction, a bump is slidingly embedded inside the movable groove, the bump is fixedly connected with an outer wall of the movable groove through a bolt and slidingly embedded in a thread groove of the reciprocating screw, and an outer wall of the outer cylinder is slidingly sleeved with gear plates, the gear plates mesh with the transportation structure.

Preferably, a top end of the reciprocating screw is fixedly connected with a sliding rod, a two-section limiting rod is welded on an outer wall of the girder, the limiting rod is slidingly connected and fits with the sliding rod mutually, the photoelectric switches are fixedly connected with the limiting rod, and the slipping sheet is in bolted and fixed connection with the sliding rod.

Preferably, the girder is fixedly connected with a stand through a strut, one end of the stand is movably connected with a regulating rod, the regulating rod is elastically connected with one end of a rotating rod that is away from the vibration hammer, a drawstring is wound on the winding rod and the drawstring has a free end fixedly connected with the rotating rod, the winding rod rotates synchronously with the outer cylinder under the action of the O-shaped conveyor belt, and the winding rod winds the drawstring.

Preferably, the one-way limiting structure includes ratchet wheels and pawls, the ratchet wheels are coaxially and fixedly connected with both ends of the winding rod, the pawls are disposed outside the ratchet wheels, a connector is fixed to the stand, the pawls are elastically connected inside the connector, the connector is fixedly connected with an electromagnet, the electromagnet is in communication connection with the photoelectric switches, and when the photoelectric switches are triggered, the electromagnet is powered on to absorb the pawls, then the pawls are separated from the ratchet wheels.

Preferably, a diagonal rod is rotationally connected with a middle-line position of the girder, a joint of the diagonal rod and the girder is provided with a torsion spring, the diagonal rod is away from a rotating end and rotationally connected with a roller, an inner side of the girder is rotationally connected with a winding roll on which a steel wire rope is wound, a free end of the steel wire rope is fixedly connected with an outer wall of the diagonal rod, both ends of the winding roll are disposed in a manner of penetrating through the girder, and the winding roll penetrating through the girder is provided with a cross groove.

Preferably, the transportation structure includes two screws, the two screws are rotationally connected below the bearing plate, each screw is in meshing and drive connection with the gear plates, the two screws are disposed in a thread mirroring manner, and the two screws rotate reversely.

Preferably, the transportation structure further includes two front wheels and two rear wheels, the rear wheels are in drive connection with a drive structure, annular latches are disposed at middle-line positions of the front wheels, and the front wheels are in meshing and drive connection with the gear plates through the annular latches.

A detection system for a railway bridge duct concrete compactness includes a detection apparatus, further includes a data analysis module including an instrument mainframe, an external amplifier, a data collection module and a cable, and when performing detection:

S1, collecting calibration data by using the data collection module, where 1) wave velocity calibration is determined, a thickness and a vibration source distance of a detection object are set, and a predicted wave velocity in wave velocity detection information of a P wave is artificially set; and 2) to-be-detected data is collected by using the data collection module, the adjusted detection apparatus is placed in a pipe and runs to a preset calibration detection position through a remote control, a data collection operation is performed when a calibration voltage value is lower than 0.2 V, a probe fits with the inner wall of the pipe, a vibration hammer knocks, the mainframe collects data, collected data is clicked in software and knocked, a waveform head wave is obvious and presents an attenuation form wholly, then the data may be saved, and five or above waveform is suitably adopted for the wave velocity calibration;

S2, during defect detection, point-by-point data collection being performed in a preset to-be-detected area, saving the collected data, and after completing the collection, closing a data collection software;

S3, performing data parsing by using the data analysis module, where 1) firstly, a standing wave data parsing is performed, a material analysis function of a structure is selected, the data collected through wave velocity calibration is opened, the thickness and the vibration source distance of the detection object are set, the predicted wave velocity in the wave velocity detection information of the P wave is artificially set, batch operation and result list are clicked, to obtain a parsing result and save the result;

2) concrete defect detection data parsing is performed, defect detection data is imported for sequence transformation, and early-warning radar (EWR) parameter setting is performed; and 3) spectrum setting and maximum-minimum eigenvalue (MEM) calculation are performed to generate a contour map, two-dimensional display of the result is performed, and after a two-dimensional contour line cloud map is obtained, the defect is labeled, finally a picture is saved.

In conclusion, the present disclosure includes at least one of the following beneficial technical effects.

The probe and the vibration hammer are loaded by providing the bearing plate, the advancement of the bearing plate to the inside of the pipe is achieved by using the transportation structure, the preset position inside the pipe is subjected to data collection, the transportation structure rotates for the fixed number of turns at the preset position to achieve the synchronous fit of the probe on the inner wall of the pipe, meanwhile the vibration hammer performs synchronous knocking, thus conveniently completing the data collection operation of a plurality of equidistant points at the preset position, and compared with the existing collection mode, the convenience of collection is improved.

By replacing different transportation structures and cooperating with the diagonal rod and the roller that are at the upper part and used for collision, the apparatus may adapt to different applicable scenarios and different pipe inner diameters, and the practicability of the apparatus is improved.

DETAILED DESCRIPTION OF THE EMBODIMENTS

Figure 1:
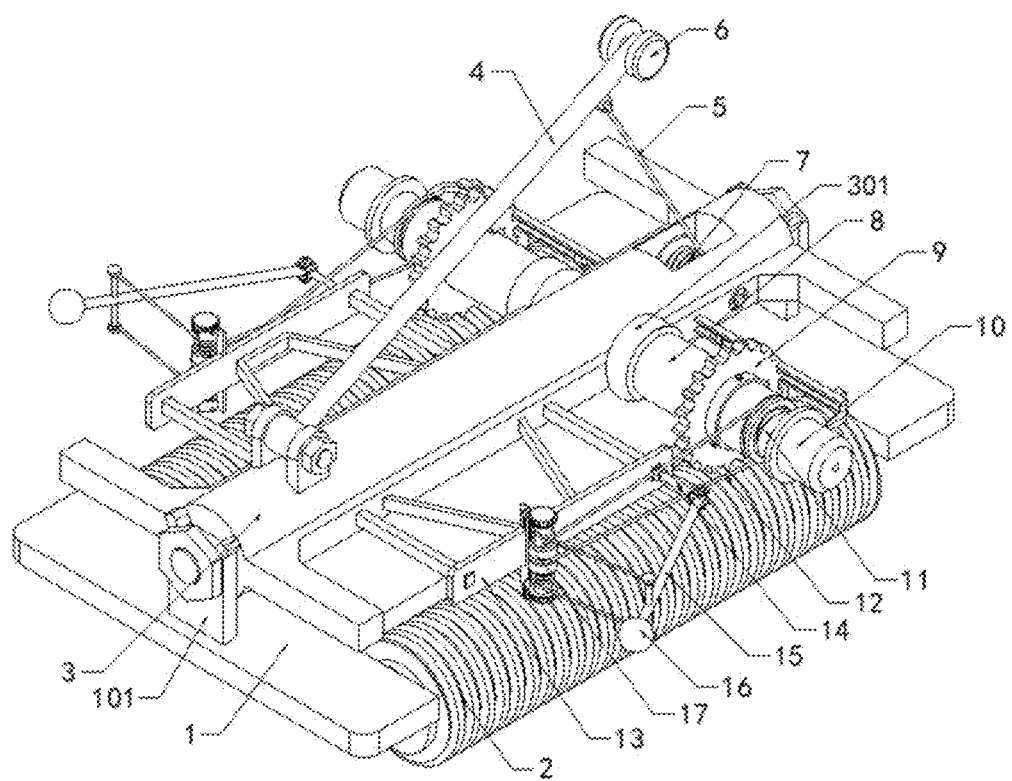
FIG. 1 is a schematic diagram of an isometric structure in embodiment I of the present disclosure.
Figure 2:
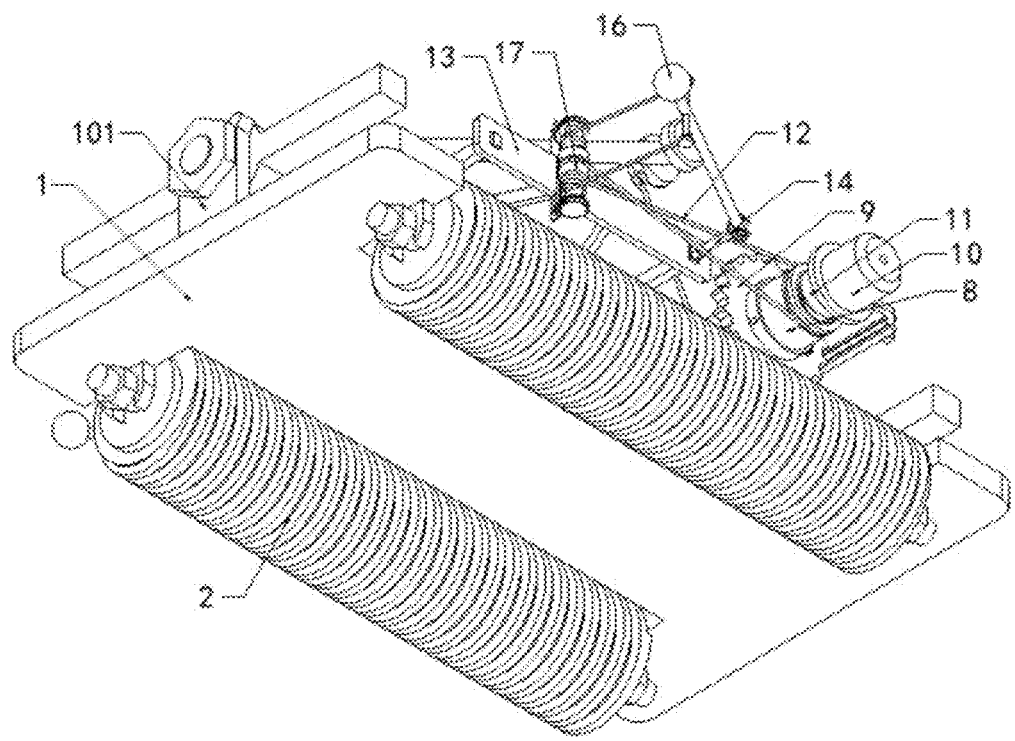
FIG. 2 is a schematic diagram of a look-up isometric structure in embodiment I of the present disclosure.
Figure 3:
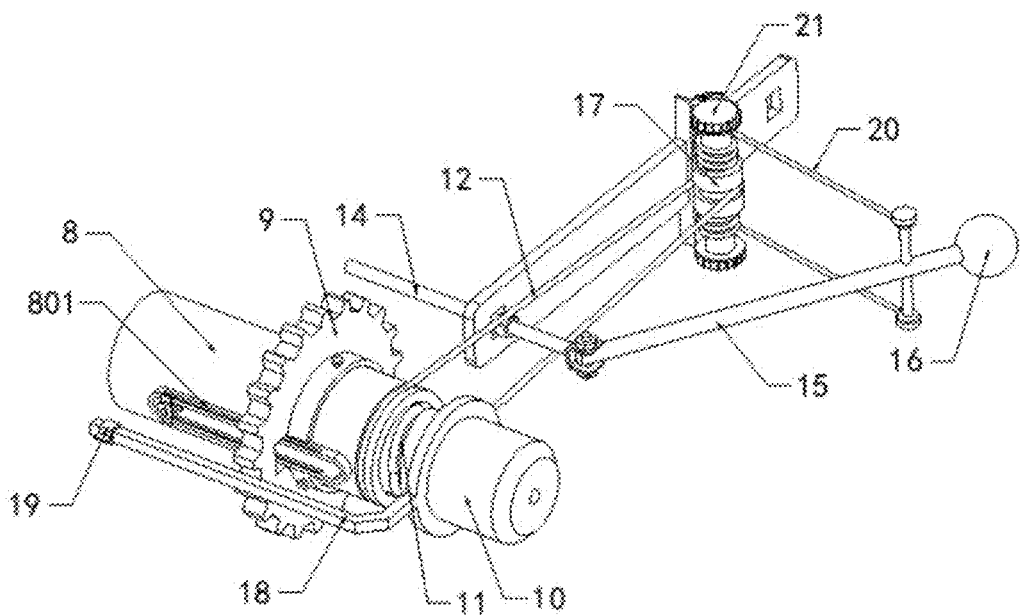
FIG. 3 is a schematic structural diagram of a probe and a vibration hammer of the present disclosure.
Figure 4:
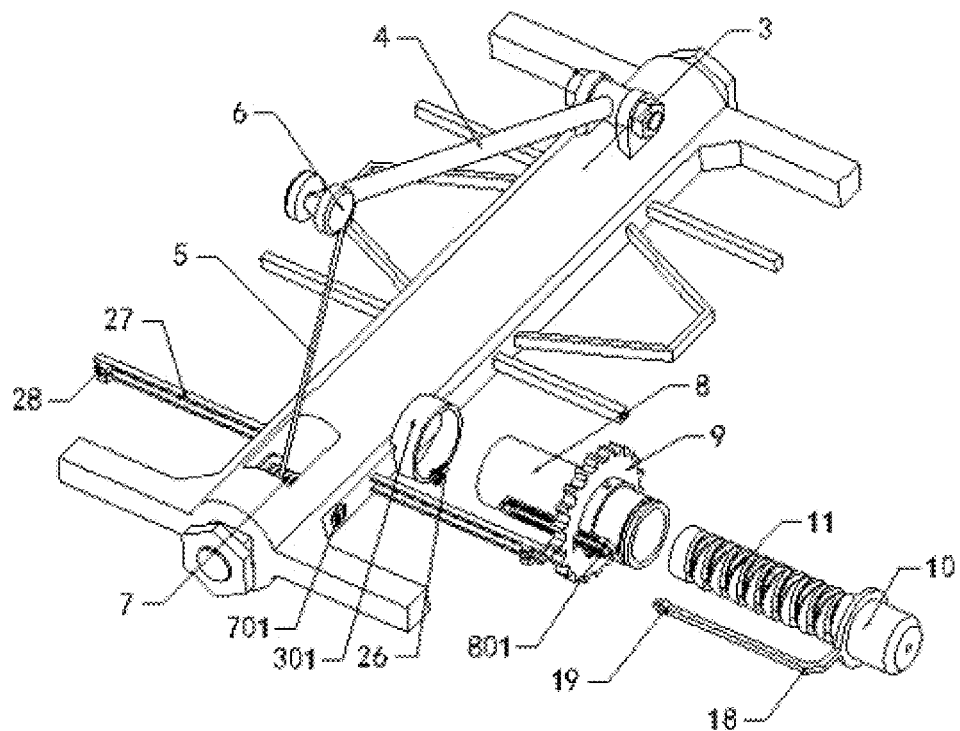
FIG. 4 is a schematic diagram of an exploded structure for mounting a probe of the present disclosure.
Figure 5:
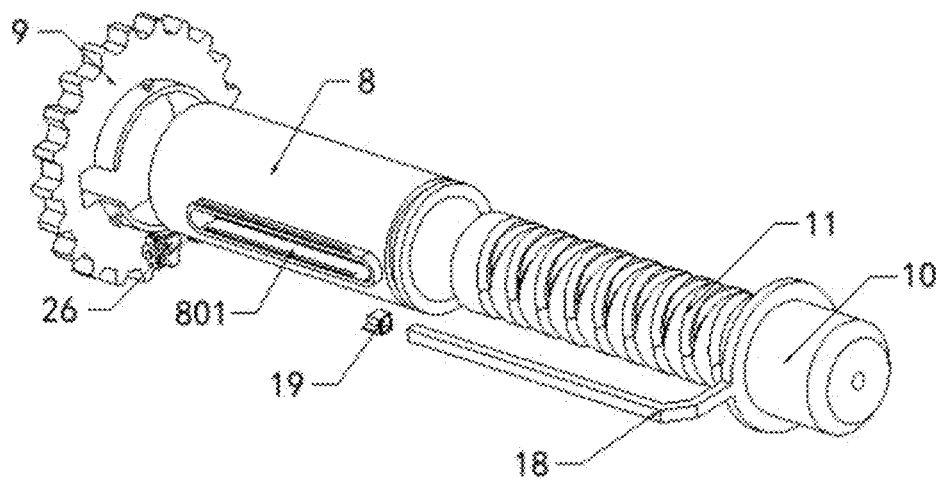
FIG. 5 is a schematic diagram of an exploded structure of a probe in the present disclosure.
Figure 6:
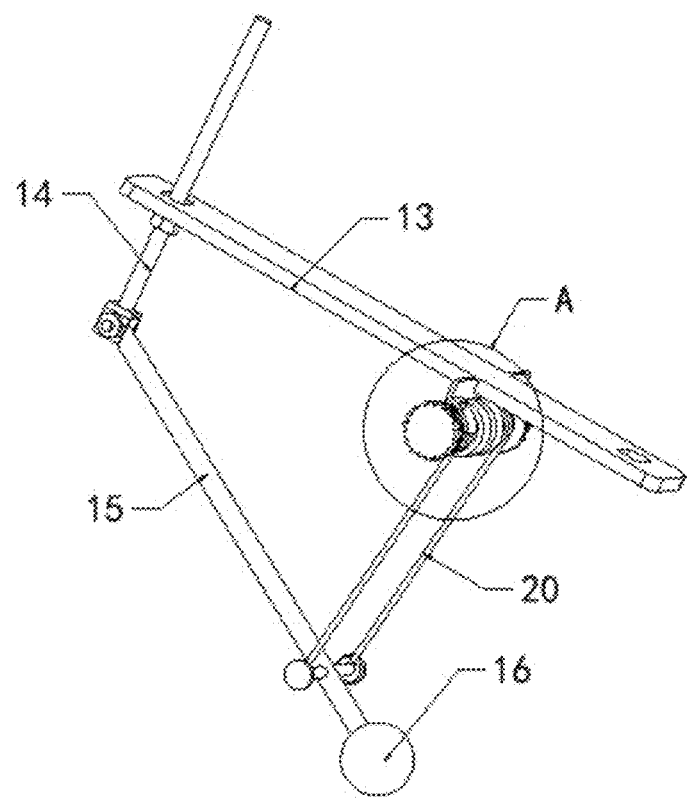
FIG. 6 is a schematic structural diagram of a vibration hammer of the present disclosure.
Figure 7:
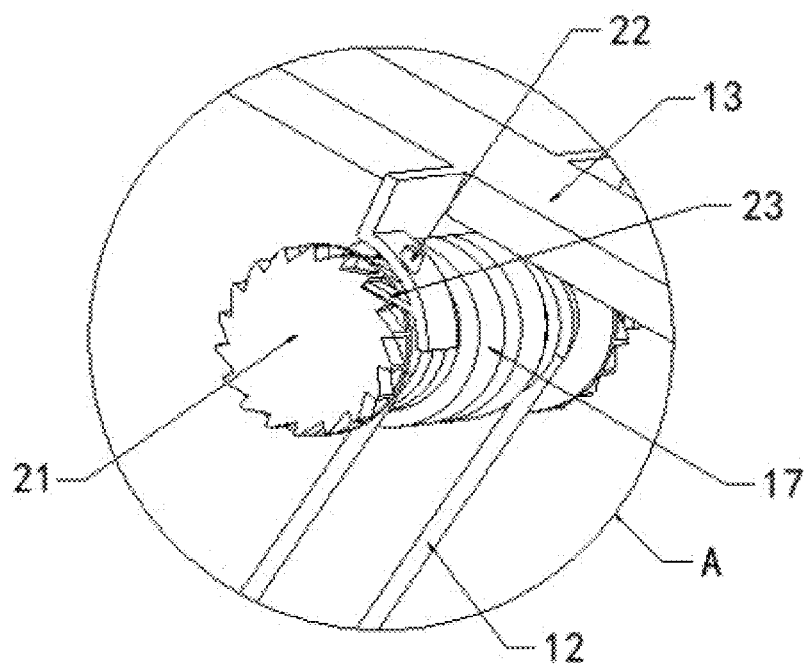
FIG. 7 is a schematic diagram of an enlarged structure at part A in the present disclosure.
Figure 8:
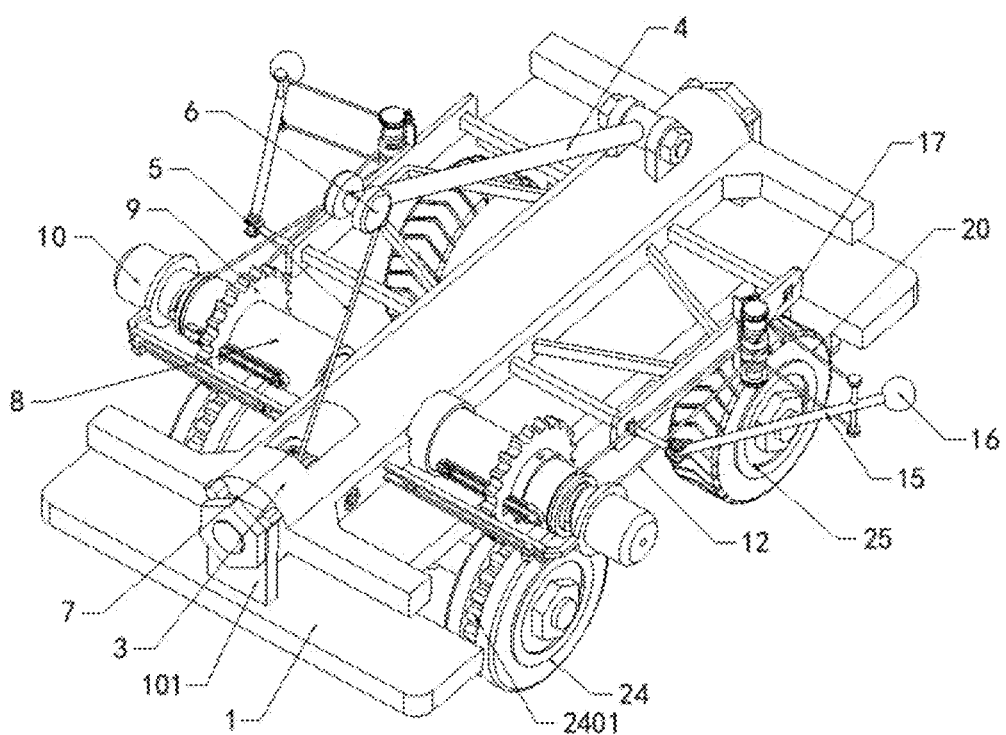
FIG. 8 is a schematic diagram of an isometric structure in embodiment II of the present disclosure.
Figure 9:
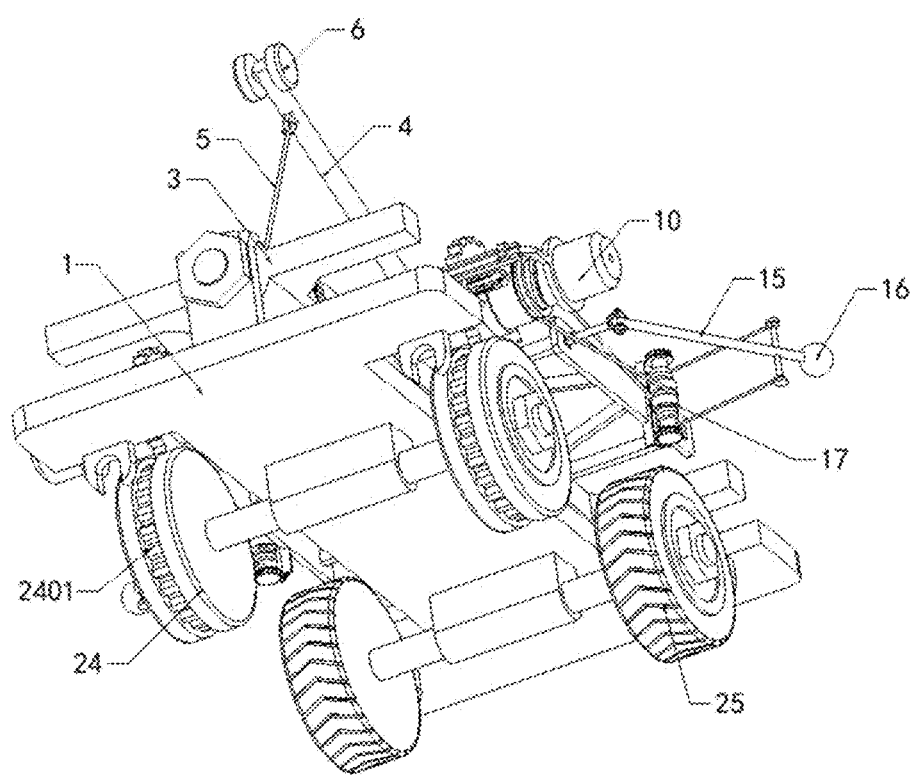
FIG. 9 is a schematic diagram of a look-up isometric structure in embodiment II of the present disclosure.

The present disclosure is further described in detail below in combination with FIG. 1-FIG. 9.

Embodiment I

Referring to FIG. 1-FIG. 7, a detection apparatus for a railway bridge duct concrete compactness includes a probe 10 in communication connection with a detection device, and a vibration hammer 16 used in combination with the probe 10, where a bearing plate 1 for transportation is disposed below the probe 10 and the vibration hammer 16, and a transportation structure is disposed below the bearing plate 1 while a girder 3 is disposed at a middle-line position above the bearing plate 1; a bracket 101 with a front view presenting a Y-shaped structure is welded at the middle-line position of the bearing plate 1, the bracket 101 is used for placing the girder 3, the girder 3 is fixedly connected with the bracket 101 through a bolt and mounted through the bracket 101, such that the lower transportation structure may be replaced conveniently when the angle is adjustable; the transportation structure includes two screws 2, the two screws 2 are rotationally connected below the bearing plate 1, each screw 2 is in meshing and drive connection with gear plates 9, the two screws 2 are disposed in a thread mirroring manner, and the two screws 2 rotate reversely; a drive structure is disposed on the bearing plate 1, the drive structure drives the two screws 2 to move synchronously and reversely, thus ensuring that the two screws 2 may move forwards along a straight line direction; the screws 2 drive the upper two gear plates 9 to rotate in a meshing manner when rotating, thus implementing the drive of the reciprocating screw 11; and through the mutual fit of the advancing distance and the distance that the probe 10 moves along an axial direction, the same distance for each fitting position of the probe 10 is ensured, a front positioning mark is not required, and the convenience of the operation is improved.

A tail end of the probe 10 is movably connected with the reciprocating screw 11 and fixedly connected with a thread rod, the probe 10 regulates the distance between the thread rod and the reciprocating screw 11, to ensure that the reciprocating screw 11 will not be affected by the probe 10 during a reciprocating motion when the distance capable of being stretched out by the probe 10 is adjusted through a bump 26; an outer side of the reciprocating screw 11 is rotationally connected with an outer cylinder 8, the outer cylinder 8 is in drive connection with the transportation structure, the reciprocating screw 11 performs an axial reciprocating motion together with the probe 10 under the rotating action of the outer cylinder 8, and the outer cylinder 8 is rotationally connected with the girder 3 through a limiting ring 301; the limiting ring 301 is axially limited with the girder 3 to rotate radially, the outer cylinder 8 is provided with a movable groove 801 along an axial direction, the movable groove 801 is a notched ring structure welded with the outer cylinder 8, the position that the outer cylinder 8 corresponds to the inside of the notched ring is disposed in a penetrating manner, a bump 26 is slidingly embedded inside the movable groove 801, the bump 26 is fixedly connected with an outer wall of the movable groove 801 through a bolt, a tail end of the bump 26 is rotationally connected with the thread rod of the bolt, a gasket that is slidingly embedded in the movable groove 801 is fixedly connected with the thread rod, the thread rod is also in threaded connection with a nut sleeve, the nut sleeve is located outside the movable groove 801, the fixation for the position of the thread rod is implemented by regulating the distance between the nut sleeve and the gasket, then the position of the bump 26 is fixed, the bump 26 is slidingly embedded in a thread groove of the reciprocating screw 11, the bump 26 fixedly connected through the bolt enables the position thereof to change, thus regulating the length that the reciprocating screw 11 stretches out of the outer cylinder 8 and adapting to different pipe diameters; when the position of the bump 26 is regulated, the distance between the probe 10 and the end part of the reciprocating screw 11 is regulated synchronously, to ensure that the reciprocating screw 11 may enter the inside the outer cylinder 8, an outer wall of the outer cylinder 8 is slidingly sleeved with gear plates 9, the gear plates 9 mesh with the transportation structure and are provided with straight grooves, the straight grooves are disposed in fit with the movable groove 801 to ensure that the gear plates 9 may perform axial displacements on the outer cylinder 8, and the gear plates 9 are fixedly connected with the outer wall of the outer cylinder 8 through the bolt; when running, the transportation structure drives the gear plates 9 to rotate by itself rotation, then the gear plates 9 rotate together with the outer cylinder 8, since an axial position between the outer cylinder 8 and the limiting ring 301 is table and a radial position of the reciprocating screw 11 is stable, the outer cylinder 8 drives the reciprocating screw 11 to displace from the axial direction to the outside by the action of the bump 26 while running, the maximum running distance of the reciprocating screw 11 is reached at this time when displacing to a thread junction of the reciprocating screw 11, the probe 10 fits with the inner wall of the pipe at this time, meanwhile the slipping sheet 19 triggers the photoelectric switches 28, the top end of the reciprocating screw 11 is fixedly connected with a sliding rod 18, a two-section limiting rod 27 is welded on an outer wall of the girder 3, the limiting rod 27 is slidingly connected and fits with the sliding rod 18 mutually, the photoelectric switches 28 are fixedly connected with the limiting rod 27, the slipping sheet 19 is in bolted and fixed connection with the sliding rod 18, and the photoelectric switches 28 and the slipping sheet 19 correspond to the two thread junctions of the reciprocating screw 11, respectively.

A winding rod 17 for controlling a position of the vibration hammer 16 is arranged below the vibration hammer 16, the winding rod 17 is in drive connection with the outer cylinder 8 through the O-shaped conveyor belt 12, both ends of the winding rod 17 are provided with a one-way limiting structure, the girder 3 is fixedly connected with a stand 13 through a strut, one end of the stand 13 is movably connected with a regulating rod 14, the regulating rod 14 is elastically connected with one end of a rotating rod 15 that is away from the vibration hammer 16, a joint of the top end of the regulating rod 14 and the rotating rod 15 is provided with a torsion spring, the rotating rod 15 has a tendency of moving away from one side of the girder 3 under the action of the torsion spring, a drawstring 20 is wound on the winding rod 17 and has a free end fixedly connected with the rotating rod 15, the winding rod 17 rotates synchronously with the outer cylinder 8 under the action of the O-shaped conveyor belt 12, and the winding rod 17 winds the drawstring 20.

One side of the probe 10 is provided with the photoelectric switches 28, the photoelectric switches 28 are used in cooperation with the one-way limiting structure, the slipping sheet 19 that displaces synchronously with the probe 10 is disposed on one side of the probe 10, the slipping sheet 19 is used in fit with the photoelectric switches 28, the photoelectric switches 28 are disposed on both sides of the two-section limiting rod 27, the slipping sheet 19 triggers the photoelectric switches 28 when displacing along the probe 10 and reaching a position between the photoelectric switches 28, at this time the electromagnet 22 is powered on to attract the pawls 23 to rotate to one side thereof, the ratchet wheels 21 losing the limitation of the pawls 23 bounce up under the action of the torsion spring at one end of the rotating rod 15, the vibration hammer 16 at one end of the rotating rod 15 knocks the pipe wall, then an echo waveform signal is obtained through the probe 10, after the photoelectric switches 28 are triggered, the one-way limiting structure loses the one-way limiting function, the one-way limiting structure includes the ratchet wheels 21 and the pawls 23, the ratchet wheels 21 are coaxially and fixedly connected with both ends of the winding rod 17, the pawls 23 are disposed outside the ratchet wheels 21, a connector is fixed to the stand 13, the pawls 23 are elastically connected inside the connector, tail ends of the pawls 23 are rotationally connected with the connector, a rotating joint is provided with the torsion spring that has a force for twisting the pawls 23 to one sides of the ratchet wheels 21, the connector is fixedly connected with the electromagnet 22, the electromagnet 22 is in communication connection with the photoelectric switches 28, and when the photoelectric switches 28 are triggered, the electromagnet 22 is powered on.

A diagonal rod 4 is rotationally connected with a middle-line position of the girder 3, a joint of the diagonal rod 4 and the girder 3 is provided with the torsion spring, the diagonal rod 4 is away from a rotating end and rotationally connected with a roller 6, an inner side of the girder 3 is rotationally connected with the winding roll 7, a steel wire rope 5 is wound on the winding roll 7, a free end of the steel wire rope 5 is fixedly connected with an outer wall of the diagonal rod 4, both ends of the winding roll 7 are disposed in a manner of penetrating through the girder 3, and the winding roll 7 penetrating through the girder 3 is provided with a cross groove 701; a friction force is provided between the winding roll 7 and the girder 3 to ensure that the torsion spring at one end of the diagonal rod 4 will not pull the winding roll 7, thus leading to the relaxing of the steel wire rope 5, operating the crossed groove 701 through a screwdriver can rotate the winding roll 7 to implement the regulation for the level of tightness of the steel wire rope 5, the level of tightness of the steel wire rope 5 ensures that the range of activity of the roller 6 is greater than the maximum range capable of being contained by the pipe, thus ensuring that the roller 6 has a certain down force to the entire apparatus when in contact with the pipe wall, ensuring that the lower transportation structure and the pipe have enough friction force, reducing a slipping possibility occurred to the transportation structure, and ensuring the testing accuracy.

A detection system for a railway bridge duct concrete compactness includes a detection apparatus, further includes a data analysis module including an instrument mainframe, an external amplifier, a data collection module and a cable, and when performing detection:

S1, collecting calibration data by using the data collection module, where 1. wave velocity calibration is determined, a thickness and a vibration source distance of a detection object are set, and a predicted wave velocity in wave velocity detection information of a P wave is artificially set; and
2. to-be-detected data is collected by using the data collection module, the adjusted detection apparatus is placed in a pipe and runs to a preset calibration detection position through a remote control, a data collection operation is performed when a calibration voltage value is lower than 0.2 V, a probe 10 fits with the inner wall of the pipe, a vibration hammer 16 knocks, the mainframe collects data, collected data is clicked in software and knocked, a waveform head wave is obvious and presents an attenuation form wholly, then the data may be saved, and five or above waveform is suitably adopted for the wave velocity calibration;

S2, during defect detection, point-by-point data collection being performed in a preset to-be-detected area, saving the collected data, and after completing the collection, closing a data collection software;

S3, performing data parsing by using the data analysis module, where 1. firstly, a standing wave data parsing is performed, a material analysis function of a structure is selected, the data collected through wave velocity calibration is opened, the thickness and the vibration source distance of the detection object are set, the predicted wave velocity in the wave velocity detection information of the P wave is artificially set, the batch operation and result list are clicked, to obtain the parsing result, the optimal result serves as the parsing result, the result is saved, the accuracy of the result is determined, a predominant period is calculated by MEM for verification, after the predominant period is obtained through calculation, a double thickness is divided by time, to obtain the wave velocity;
2. the concrete defect detection data parsing is performed, the defect detection data is imported for sequence transformation, EWR parameter setting is performed, a Y starting position is the distance from a first measuring point to the structure edge, the interval of the Y measuring point, the detection times of each point and the maximum wall thickness are set and expressed by horizontal axis, and the wave velocity for calculation is altered;
3. spectrum setting and MEM calculation are performed to generate a contour map, the two-dimensional display of the result is performed, and after the two-dimensional contour line cloud map is obtained, the defect is labeled, finally the picture is saved.

Embodiment II

The difference from the embodiment I only lies in the following contents.

Referring to FIG. 3-FIG. 9, a detection apparatus for a railway bridge duct concrete compactness includes a probe 10 in communication connection with a detection device, and a vibration hammer 16 used in combination with the probe 10, where a bearing plate 1 for transportation is disposed below the probe 10 and the vibration hammer 16, and a transportation structure is disposed below the bearing plate 1 while a girder 3 is disposed at a middle line position above the bearing plate 1; a bracket 101 is welded at the middle-line position of the bearing plate 1 and used for placing the girder 3, the girder 3 is fixedly connected with the bracket 101 through the bolt and mounted through the bracket 101, such that the lower transportation structure may be replaced conveniently when the angle is regulated, the transportation structure further includes two front wheels 24 and two rear wheels 25, the rear wheels 25 are in drive connection with a drive structure, annular latches 2401 are disposed at middle-line positions of the front wheels 24, the front wheels 24 are in meshing and drive connection with the gear plates 9 through the annular latches 2401, when the rear wheels 25 are driven, the front wheels 24 rotate synchronously, the latches 2401 at the middle-line position mesh and drive the gear plates 9, such that the above outer cylinder 8 runs synchronously, to implement the fit with the inner wall of the pipe.

A tail end of the probe 10 is movably connected with the reciprocating screw 11, the tail end of the probe 10 is fixedly connected with a thread rod, the probe 10 regulates the distance between the thread rod and the reciprocating screw 11, the outer side of the reciprocating screw 11 is rotationally connected with an outer cylinder 8, the outer cylinder 8 is in drive connection with the transportation structure, the reciprocating screw 11 performs an axial reciprocating motion together with the probe 10 under the rotating action of the outer cylinder 8, and the outer cylinder 8 is rotationally connected with the girder 3 through a limiting ring 301.

A winding rod 17 for controlling the position of the vibration hammer 16 is disposed below the vibration hammer 16, the winding rod 17 is in drive connection with the outer cylinder 8 through an O-shaped conveyor belt 12, and both ends of the winding rod 17 are provided with a one-way limiting structure.

One side of the probe 10 is provided with photoelectric switches 28, the photoelectric switches 28 are used in cooperation with the one-way limiting structure, the slipping sheet 19 that displaces synchronously with the probe 10 is disposed on one side of the probe 10, the slipping sheet 19 is used in fit with the photoelectric switches 28 to trigger the slipping sheet 19, the photoelectric switches 28 are disposed on both sides of the two-section limiting rod 27, the slipping sheet 19 enables the photoelectric switches 28 to be triggered when displacing along the probe 10 and reaching the position between the photoelectric switches 28, at this time the electromagnet 22 is powered on to attract the pawls 23 to rotate to one side thereof, the ratchet wheels 21 losing the limitation of the pawls 23 bounce up under the action of the torsion spring at one end of the rotating rod 15, the vibration hammer 16 at one end of the rotating rod 15 knocks the pipe wall, then the echo waveform signal is obtained through the probe 10, after the photoelectric switches 28 are triggered, the one-way limiting structure loses the one-way limiting function.

A detection system for a railway bridge duct concrete compactness includes a data analysis module, an instrument mainframe, an external amplifier, a data collection module, a probe 10 and a cable, and when performing detection:

S1, collecting calibration data by using the data collection module, where
1. wave velocity calibration is determined, a thickness and a vibration source distance of a detection object are set, and a predicted wave velocity in wave velocity detection information of a P wave is artificially set;
2. to-be-detected data is collected by using the data collection module,
the adjusted detection apparatus is placed in a pipe and runs to a preset calibration detection position through a remote control, a data collection operation is performed when a calibration voltage value is lower than 0.2 V, the probe 10 fits with the inner wall of the pipe, a vibration hammer 16 knocks, a mainframe collects the data, collected data is clicked in software and knocked, a waveform head wave is obvious and presents an attenuation form wholly, then the data may be saved, and five or above waveform is suitably adopted for the wave velocity calibration;

S2, during defect detection, point-by-point data collection being performed in a preset to-be-detected area, saving the collected data, and after completing the collection, closing a data collection software;

S3, performing data parsing by using the data analysis module, where
1. firstly, a standing wave data parsing is performed, a material analysis function of a structure is selected, the data collected through wave velocity calibration is opened, the thickness and the vibration source distance of the detection object are set, the predicted wave velocity in the wave velocity detection information of the P wave is artificially set, the batch operation and result list are clicked, to obtain the parsing result, the optimal result serves as the parsing result, the result is saved, the accuracy of the result is determined, a predominant period is calculated by MEM for verification, after the predominant period is obtained through calculation, a double thickness is divided by time, to obtain the wave velocity;
2. the concrete defect detection data parsing is performed, the defect detection data is imported for sequence transformation, EWR parameter setting is performed, a Y starting position is the distance from a first measuring point to the structure edge, the interval of the Y measuring point, the detection times of each point and the maximum wall thickness are set and expressed by horizontal axis, and the wave velocity for calculation is altered;
3. spectrum setting and MEM calculation are performed to generate a contour map, the two-dimensional display of the result is performed, and after the two-dimensional contour line cloud map is obtained, the defect is labeled, finally the picture is saved.

It is to be noted that terms "include" and "contain" or any other variant are intended to cover nonexclusive inclusions herein, so that a process, method, goods or device including a series of elements not only includes those elements but also includes other elements which are not clearly listed or further includes elements intrinsic to the process, the method, the goods or the device.

Although the embodiments of the present disclosure have been presented and described, those of ordinary skill in the art may understand that various changes, modifications, replacements and deformations can be made to these embodiments without deviating from the principle of spirit of the present disclosure, and the scope of the present disclosure is defined by the appended claims and their equivalents.

What is claimed is:

1. A detection apparatus for a railway bridge duct concrete compactness, comprising a probe in communication connection with a detection device, and a vibration hammer used in combination with the probe, wherein a bearing plate for transportation is disposed below the probe and the vibration hammer, and a transportation structure is disposed below the bearing plate while a girder is disposed at a middle-line position above the bearing plate;

a tail end of the probe is movably connected with a reciprocating screw, an outer side of the reciprocating screw is rotationally connected with an outer cylinder, the outer cylinder is in drive connection with the transportation structure, the reciprocating screw performs an axial reciprocating motion together with the probe under the rotating action of the outer cylinder, and the outer cylinder is rotationally connected with the girder through a limiting ring;

a winding rod for controlling a position of the vibration hammer is disposed below the vibration hammer, the winding rod is in drive connection with the outer cylinder through an O-shaped conveyor belt, and both ends of the winding rod are provided with a one-way limiting structure;

one side of the probe is provided with photoelectric switches, the photoelectric switches are used in cooperation with the one-way limiting structure, a slipping sheet that displaces synchronously with the probe is disposed on one side of the probe, the slipping sheet is used in fit with the photoelectric switches, and after the photoelectric switches are triggered, the one-way limiting structure loses a one-way limiting function; and the outer cylinder is provided with a movable groove along an axial direction, a bump is slidingly embedded inside the movable groove, the bump is fixedly connected with an outer wall of the movable groove through a bolt, the bump is slidingly embedded in a thread groove of the reciprocating screw, and an outer wall of the outer cylinder is slidingly sleeved with gear plates, the gear plates mesh with the transportation structure.

2. The detection apparatus for the railway bridge duct concrete compactness according to claim 1, wherein a top end of the reciprocating screw is fixedly connected with a sliding rod, a two-section limiting rod is welded on an outer wall of the girder, the limiting rod is slidingly connected and fits with the sliding rod mutually, the photoelectric switches are fixedly connected with the limiting rod, and the slipping sheet is in bolted and fixed connection with the sliding rod.

3. The detection apparatus for the railway bridge duct concrete compactness according to claim 1, wherein the girder is fixedly connected with a stand through a strut, one end of the stand is movably connected with a regulating rod, the regulating rod is elastically connected with one end of a rotating rod that is away from the vibration hammer, a drawstring is wound on the winding rod and the drawstring has a free end fixedly connected with the rotating rod, the winding rod rotates synchronously with the outer cylinder under the action of the O-shaped conveyor belt, and the winding rod winds the drawstring.

4. The detection apparatus for the railway bridge duct concrete compactness according to claim 3, wherein the one-way limiting structure comprises ratchet wheels and pawls, the ratchet wheels are coaxially and fixedly connected with both ends of the winding rod, the pawls are disposed outside the ratchet wheels, a connector is fixed to the stand, the pawls are elastically connected inside the connector, the connector is fixedly connected with an electromagnet, the electromagnet is in communication connection with the photoelectric switches, and when the photoelectric switches are triggered, the electromagnet is powered on to absorb the pawls, and then the pawls are separated from the ratchet wheels.

5. The detection apparatus for the railway bridge duct concrete compactness according to claim 1, wherein a diagonal rod is rotationally connected with a middle-line position of the girder, a joint of the diagonal rod and the girder is provided with a torsion spring, the diagonal rod is away from a rotating end and rotationally connected with a roller, an inner side of the girder is rotationally connected with a winding roll, and a steel wire rope is wound on the winding roll, a free end of the steel wire rope is fixedly connected with an outer wall of the diagonal rod, both ends of the winding roll are disposed in a manner of penetrating through the girder, and the winding roll penetrating through the girder is provided with a cross groove.

6. The detection apparatus for the railway bridge duct concrete compactness according to claim 1, wherein the transportation structure comprises two screws, the two screws are rotationally connected below the bearing plate, each screw is in meshing and drive connection with the gear plates, the two screws are disposed in a thread mirroring manner, and the two screws rotate reversely.

7. The detection apparatus for the railway bridge duct concrete compactness according to claim 1, wherein the transportation structure further comprises two front wheels and two rear wheels, the rear wheels are in drive connection with a drive structure, annular latches are disposed at middle-line positions of the front wheels, and the front wheels are in meshing and drive connection with the gear plates through the annular latches.

* * * * *